United States Patent
Ernst et al.

(10) Patent No.: US 7,920,279 B2
(45) Date of Patent: Apr. 5, 2011

(54) APPARATUS AND METHODS FOR IMPROVED PRINTING IN A TANDEM LED PRINTHEAD ENGINE

(75) Inventors: Larry M. Ernst, Longmont, CO (US); Steven G. Ludwig, Boulder, CO (US)

(73) Assignee: Infoprint Solutions Company, LLC

( * ) Notice: Subject to any disclaimer, the term of this patent is extended or adjusted under 35 U.S.C. 154(b) by 1209 days.

(21) Appl. No.: 11/549,170

(22) Filed: Oct. 13, 2006

(65) Prior Publication Data

US 2008/0144063 A1 Jun. 19, 2008

(51) Int. Cl.
G06K 15/00 (2006.01)
B41C 1/00 (2006.01)
H04N 1/46 (2006.01)
B41J 29/38 (2006.01)
B41J 29/393 (2006.01)
B41J 2/42 (2006.01)
B41J 2/385 (2006.01)
G03G 15/08 (2006.01)
G03G 15/00 (2006.01)

(52) U.S. Cl. .......... 358/1.12; 358/3.23; 358/514; 347/7; 347/19; 347/116; 399/27; 399/45

(58) Field of Classification Search .......... 358/3.32, 358/514, 1.1–1.18; 347/116, 7, 19; 101/467; 715/527; 399/27, 45
See application file for complete search history.

(56) References Cited

U.S. PATENT DOCUMENTS

| | | | |
|---|---|---|---|
| 4,721,969 A | 1/1988 | Asano | |
| 5,093,674 A * | 3/1992 | Storlie | 347/116 |
| 5,266,976 A | 11/1993 | Ohigashi et al. | |
| 5,285,247 A | 2/1994 | Itoh | |
| 6,101,944 A * | 8/2000 | Schmid et al. | 101/467 |
| 6,561,613 B2 * | 5/2003 | Cunnagin et al. | 347/19 |
| 6,731,884 B2 * | 5/2004 | Kato | 399/27 |
| 6,738,162 B1 * | 5/2004 | Martens et al. | 358/3.32 |
| 6,763,199 B2 | 7/2004 | Conrow et al. | |
| 6,813,451 B2 * | 11/2004 | Wibbels | 399/45 |
| 7,684,095 B2 * | 3/2010 | Nystrom et al. | 358/514 |
| 7,690,750 B2 * | 4/2010 | Kawatoko et al. | 347/19 |
| 2003/0146945 A1* | 8/2003 | Inui et al. | 347/7 |
| 2004/0139403 A1* | 7/2004 | Yakubov et al. | 715/527 |
| 2004/0211904 A1* | 10/2004 | Scowen et al. | 250/341.1 |

FOREIGN PATENT DOCUMENTS

| | | | |
|---|---|---|---|
| JP | 2003039793 A | * | 2/2003 |
| JP | 2005096369 A | * | 4/2005 |

* cited by examiner

Primary Examiner — James A Thompson
Assistant Examiner — Satwant K Singh
(74) Attorney, Agent, or Firm — Duft Bornsen & Fishman, LLP

(57) ABSTRACT

Apparatus and methods for adjusting a skew angle of an LED array in the second of dual/tandem print engine systems to compensate for shrinkage of the printable medium exiting the first print engine. Features and aspects hereof provide for manually and/or automatically measuring the shrinkage of the printable medium as it exits the first print engine and for automatically and/or manually adjusting the skew angle of the mounting of the LED array in the second print engine. The image data applied through the LED to the corresponding photoconductor of the second print engine is similarly skewed to match the skew angle of the LED array. Thus a substantially normal bitmap image is applied through the skewed LED to the photoconductor of the second print engine shrunk in the width dimension. Visual artifacts and anomalies from the mathematical approximations and rounding are visually imperceptible at sufficiently high resolutions.

20 Claims, 8 Drawing Sheets

APPARATUS AND METHODS FOR IMPROVED PRINTING IN A TANDEM LED PRINTHEAD ENGINE

BACKGROUND

1. Field of the Invention

The invention relates to the field of printing systems and in particular relates to printing systems having dual/tandem print engines using LED array exposure technologies that correct for shrinkage of the printable medium from the first print engine.

2. Statement of the Problem

In high performance printing systems, which can be continuous form printing systems or cut sheet printing systems, the image marking engines apply RIPped (e.g., rasterized) images to continuous form paper moving through the marking engine at high rates of speed. Most such printing system use electrophotographic techniques to apply a rasterized image to the printable medium as dots or pixels of toner particles transferred to the medium and fused thereto typically by heat and pressure. A photoconductive surface is controllably exposed to create a latent image thereon represented as charged and discharged points or pixels. Charged toner particles are then transferred to the photoconductor to develop the latent image and the developed image is then transferred to the printable medium.

In one common configuration, dual or tandem print engines receive the continuous form printable medium whereby a first print engine applies images to a first side of the continuous form printable medium. A second print engine receives the output from the first and applies a second image to a second side. Often, such tandem print engines are physically configured such that the continuous form medium printable medium flips over after it exits the first print engine and is about to enter the second print engine.

In another common configuration, each of multiple print engines may print a different image on the same side of the printable medium. For example, a first print engine may imprint a first color image on a side of the printable medium and the second print engine may imprint a second image of a different color on the same side of the printable medium. Often the first color may be used for text while the second color may be used as a highlight color.

In still other configurations, full four color printing may be achieved by imaging each of the four standard colors in a sequence of four print engines. The continuous form printable medium may pass from the first to the second, to the third, and to the fourth print engines each imprinting a different color and each print engine fusing or fixing its respective image to the same image side of the printable medium.

It is generally known in such dual/tandem print engine configurations that the printable medium (typically paper) may shrink especially in its width dimension (orthogonal to the process direction of paper movement) upon exit from the first print engine. Typically such shrinkage is caused by the heat and pressure used by the print engine to fix or fuse the transferred, toned image onto the printable medium. Such heat and pressure may cause the printable medium (particularly paper) to shrink in the width dimension in which it is not constrained.

Such shrinkage of the printable medium gives rise to problems of alignment and scaling accuracy of the first images applied to the printable medium versus subsequent images applied to the printable medium—whether on the same side or on opposite sides of the printable medium. Frequently printing applications require a high degree of correlation between the size and position of images imprinted on both sides of the continuous form printable medium. Or, a high degree of precision in aligning/registering is required for multiple images all printed in sequence on the same side of the printable medium.

When the print engines use laser printhead mechanisms to expose the latent image on the photoconductor, the laser optics mechanism may be easily altered with respect to its timing on the second print engine to compress the exposed image and thereby compensate for shrinkage of the printable medium upon exit from the first print engine. Other prior solutions include applying multiple developed images to either or both sides of the continuous form printable medium and then fusing or fixing all the distinct images simultaneously so that differential shrinkage is not a factor in differentiating the front side from a backside or a first image from a subsequent image applied to the same side. However, such fusing techniques are complex and the un-fused images require careful, complex handling to avoid destruction of the image.

Still other prior techniques require pre-treating the printable medium before entering the first print engine so that no further shrinkage will occur upon exit from the first printing engine. Rather, all expected shrinkage is provided by the pre-treatment (e.g., heating) process prior to printing either side of the continuous form printable medium.

Presently practiced solutions for such a problem limit the use of LED array printheads in which the pixel spacing is fixed by the static LED spacing of the array. Without resorting to expensive, complex solutions such as pre-treatment or simultaneous fusing of both sides, LED array dual print engine system suffer from differential shrinkage on the two sides of the printable medium.

It is evident from the above discussion that a need exists for an improved method and associated systems for adapting the printing system to adjust for shrinkage of the printable medium upon exit from the first print engine of a dual/tandem LED-based printing system.

SUMMARY

The invention solves the above and other related problems with methods and associated systems and apparatus for improved shrinkage adaptation in a dual/tandem print engine system using LED array photoconductor exposure technologies. In a tandem printing system having a first print engine applying a first image to a first side of a printable medium and a second print engine applying a second image to a second side of the printable medium, the LED array within the second print engine is skewed in accordance with features and aspects hereof to reduce the photoconductors exposure width of the second print engine in proportion to the shrinkage of the printable medium as it exits the first print engine. Features and aspects hereof also modify the second side images bitmap image to correspond to the skewed angle of the LED array of the second print engine thus generating a substantially normal bitmap image having a reduced width dimension corresponding to the shrinkage of the printable medium. Other aspects allow for multiple images to be imprinted on the same side of the printable medium by separate print engines. The first print engine may cause shrinkage and thus the second print engine uses a skewed position of its LED array to compensate for the shrinkage produced by the firs print engine.

In one aspect hereof a printing system is provided. The system includes a first print engine for applying a first image to a printable medium and for fixing the first image on the printable medium. The system also includes a second print engine for applying a second image to the printable medium and for fixing the second image on the printable medium, such that the second print engine is adapted to receive the printable medium from the first print engine following fixing of the first image on the printable medium. The second print engine includes an LED array for generating the image to be applied and fixed on the printable medium and includes a controller coupled to the LED array for applying rasterized data thereto. The LED array is positioned at a non-orthogonal angle relative to the process direction of movement of the printable medium. The controller is adapted to modify the second image for application to the LED array in accordance with the angle of the LED array.

In another aspect, a method is provided for multiple image printing. The method includes applying a first image to a printable medium using a first print engine. The method then provides for fixing the first image to the printable medium. The method also provides for adjusting an angle of mounting of an LED array in a second print engine. The method then includes applying, responsive to fixing of the first image, a second image to the printable medium using the LED array. Next the method provides for fixing the second image to the printable medium. The angle of mounting of the LED array is sufficient to compensate the second image for shrinkage of the printable medium following fixing of the first image.

The invention may include other exemplary embodiments described below.

DESCRIPTION OF THE DRAWINGS

The same reference number represents the same element on all drawings.

DETAILED DESCRIPTION OF THE DRAWINGS

FIGS. 1 through 8 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
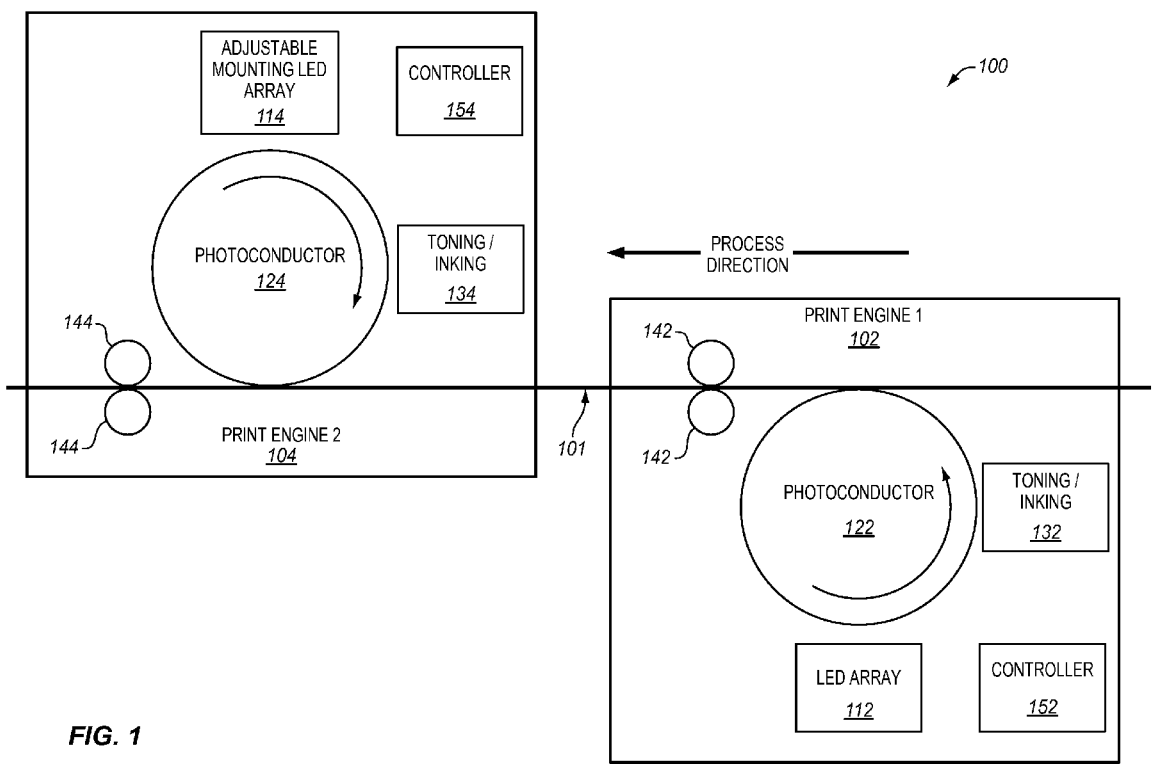
FIG. 1 is a block diagram of a system in accordance with features and aspects hereof to shrink an image applied to a printable medium by a second print engine in proportion to the shrinkage of the medium upon exit from a first print engine.

FIG. 1 is a block diagram of a printing system 100 including two printing engines: print engine 1 102 and print engine 2 104. System 100 is shown as a side view of the dual or tandem print engines 102 and 104 applying respective images to a first and second sides of printable medium 101 also viewed side edge on. The tandem print engines are arranged such that a first print engine 102 generates and fixes/fuses a first image on a first side of printable medium 101 and the second print engine 104 applies and fixes/fuses images on a second side of the printable medium 101. Those of ordinary skill in the art will readily recognize numerous configurations for such dual print engines 102 and 104 to enable printing on both sides of printable medium 101. For example, both print engines may be housed within a single system enclosure—a first engine 102 oriented to print on the bottom side of printable medium 101 and a second engine 104 oriented in the system enclosure to print on the top side of printable medium 101 (essentially at shown in FIG. 1). Or, for example, each print engine may be housed in a separate system enclosure in a common orientation printing on the top side of a continuous form printable medium. In such a configuration, the continuous form printable medium is twisted 180° (i.e., flipped over) after it exits the first print engine before it enters second print engine. Thus, two identical printing systems (e.g., tandem print systems) may be configured to print both sides of the printable medium 101.

Further, those of ordinary skill in the art will also recognize that both first engine 102 and second engine 104 may be configured to apply respective images on the same side of the printable medium. For example, a first print engine may apply a first image using a first color while the second print engine may apply another image using a second color (often referred to as a highlight color). Or, for example, four consecutive print engines may apply standard four colors for so-called full color printing on the same side of the printable medium. Features and aspects hereof apply equally to all such printing system applications using LED arrays where a first image is imprinted and then fixed/fused such that the medium may shrink, followed by imprinting of a second image. Thus, although this discussion is presented with respect to a tandem printing system imprinting on both side of a printable medium, it will be understood more broadly by those of ordinary skill in the art to present features and aspects applicable to any printing system using an LED array in a second print engine following shrinkage of the printable medium due to fixing/fusing by a preceding first print engine.

In any such tandem printer configuration, a common control element (not shown in FIG. 1) may interact with both the first print engine 102 and with the second print engine 104 to synchronize timing of the two print engines for applying and fixing/fusing corresponding images on both sides of the printable medium. Such a common control element adapted to synchronize operations of dual print engines is well known to those of ordinary skill in the art.

As is generally known in the art, each print engine 102 and 104 includes a rotatable photoconductor element 122 and 124, respectively on which a latent image is exposed representing the image to be applied to the printable medium 101. Though depicted in FIG. 1 as a cylindrical drum, those of ordinary skill in the art will recognize that the photoconductor may be a rigid drum with a photoconductive surface applied thereto or may be a flexible belt substrate with photoconductive material applied thereto. Such design choices are well known to those of ordinary skill in the art.

The latent image is represented on the photoconductor surface by selectively charged and discharged areas. The latent image is applied to the photoconductor surface 122 and 124 by a suitable light emitting exposure device. As shown in FIG. 1, each print engine 102 and 104 uses an inline LED array 112 and 114, respectively, to controllably expose the photoconductor surface thereby applying a latent image thereto. A toning or inking element 132 and 134 of print engines 102 and 104, respectively, then applies charged ink or toner particles to the photoconductor surface 122 and 124, respectively, corresponding to the latent image thereon. The latent image is thereby developed.

As the photoconductor 122 and 124 continues to rotate it eventually encounters the printable medium 101 and transfers the developed image onto the printable medium 101. As the printable medium continues through system 100 in the direction indicated by the process direction arrow, the developed image transferred to the printable medium surface will be fixed or fused by operation of fixer/fuser 142 and 144, respectively. Typically fixer/fuser 142 and 144 operates using a combination of heat and pressure to fuse the particles of toner or ink onto the surface of the printable medium.

Those of ordinary skill in the art will recognize a wide variety of equivalent structures useful for imprinting images onto a printable medium. For example, a variety of transfer mechanisms may be utilized positioned intermediate between the photoconductor and the surface of the printable medium to effectuate improved transfer efficiency. Still further, a cleaning element may be present to clean it away un-transferred toner or ink from the photoconductor surface 122 or 124. These and other well-known features of printing systems are readily recognized by those of ordinary skill in the art and are eliminated from FIG. 1 for simplicity and brevity of this discussion.

As noted above, it remains an ongoing problem that the following fusing by fuser element 142 of print engine 1 102 that the printable medium 101 may shrink—most importantly shrink in the direction orthogonal to the process direction (i.e., shrink in the width dimension of the printable medium). In accordance with features and aspects hereof, shrinkage of the printable medium 101 is addressed by the adjustability of the LED array 114 associated with print engine 2 104. In general, in accordance with features and aspects hereof, LED array 114 of print engine 2 104 has an adjustable mounting mechanism to permit the LED array 114 to be skewed relative to the nominal direction (the nominal direction orthogonal to the process direction). Though the printable medium (e.g., paper) may also shrink in the process direction (the direction of movement of the medium), the shrinkage is minimal enough as to be ignored since the medium is typically restrained from shrinking my tractor holes and corresponding tractor feed mechanisms.

Such an adjustable mounting may include any appropriate mechanical and/or electro-mechanical means for changing the angle of LED array 114 relative to the process direction of the printable medium 101. For example, adjustable mounting LED array 114 may utilize simple set screws and/or adjustable bolt/screw mechanisms to allow manual adjustment of the angle of LED array 114 in print engine 2 104 by an operator or a field service representative. Such a manual adjustment may be performed, for example, when system 100 is initially installed and/or as a periodic tuning or adjustment of the operation of system 100. Still further, automated or semi-automated structures may be employed to adjust the angle of the LED array 114. For example, servo control motors and/or actuators may also be employed to automatically adjust the angle based on measurements of shrinkage input by an operator. Still further, the shrinkage measurements may also be automated to detect the actual shrinkage of the printable medium. Such an automated or manual measurement may be performed periodically and fed back to control systems to operate servo motors and/or actuators to move the position of the LED array 114 as a function of those measurements. As discussed further herein below, the particular angle for mounting of adjustable LED array 114 in print engine 2 104 may be determined as a function of the amount of shrinkage of the printable medium 101 upon exit from print engine 1 102.

Figure 2:
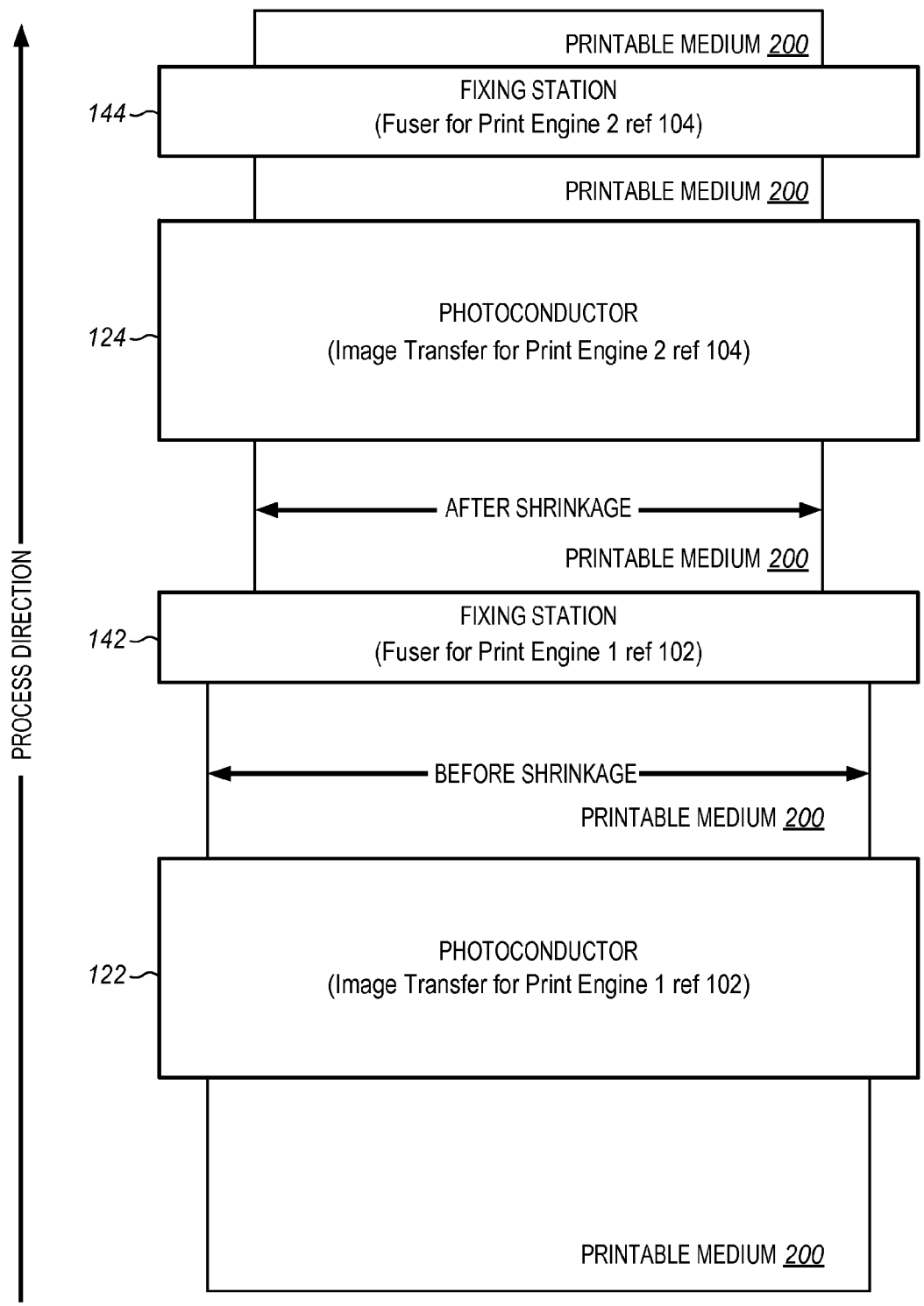
FIG. 2 is a top view of key elements of a dual/tandem printing system showing the shrinkage of the printable medium as it exits a first print engine.

FIG. 2 is a diagram depicting a top view of key components of print engine 1 102 and print engine 2 104 as a printable medium 200 passes therethrough. An arrow indicates the process direction—i.e., the direction of motion of the printable medium 200 through print engine 1 102 and print engine 2 104. FIG. 2 represents a simplified, schematic, top view of only relevant key elements of the dual/tandem print engines viewed from above the print engines. Without regard for which prints print engine is applying and fixing images on which side of printable medium 200, printable medium 200 is shown passing through both print engines 102 and 104. Printable medium 200 first encounters photoconductor 122 of print engine 1 102 and a developed image is transferred from photoconductor 122 onto the printable medium 200. A double-ended arrow indicates the nominal width of the printable medium 200 as the medium enters print engine 1 102 and passes through photoconductor 122. Following transfer of the developed image onto printable medium 200, the printable medium 200 next passes through fixing or fusing station 142 of print engine 1 102. Fuser 142 fixes or fuses the ink or toner particles of the developed image onto the printable medium 200. As noted above, a combination of heat and pressure is typically utilized in such a fuser/fixer to accomplish the fusing of the developed image onto the printable medium. However, as also noted above, when the printable medium exits fixer/fuser 142, the printable medium will have shrunk in the width dimension (i.e., in the dimension orthogonal to the process direction—the shrinkage indicated by a second double-ended arrow representing the shrunk width dimension of the printable medium following exit from fuser 142). Such shrinkage is inherent in most common printable media 200 (e.g., standard printing paper medium for example). The printable medium 200, so shrunk its width dimension, continues on and encounters elements of print engine 2 104—specifically encountering photoconductor 124 from which is transferred a second developed image and then encountering fixing/fusing station 144 to fuse or fix the second image on the printable medium 200.

As noted above and in accordance with features and aspects hereof, photoconductor 124 receives its latent image from an LED array (not shown in FIG. 2) having an adjustable mount to skew the LED array to permit compensation for the shrinkage of printable medium 200. As noted above, those of ordinary skilled in the art will readily recognize that elements of the print engine 1 102 and elements of print engine 2 104 are appropriately mounted and configured to permit transfer of images onto both sides of the printable medium 200. Thus, FIG. 2 is intended merely as suggestive of the shrinkage typical in the printable medium when exiting a first print engine. FIG. 2 is not intended to depict with any particularity or accuracy the positioning of elements of print engine 1 102 or print engine 2 104. For example, as also noted above, in a typical configuration, both print engines are configured to apply and fuse/fix images on a top side of the printable medium. Thus the continuous form printable medium is flipped or inverted as it moves between the exit of the first print engine and the entrance to the second print engine. FIG. 2 is therefore merely intended to suggest the shrinkage typical in such a dual/tandem print engine configuration.

Figure 3:
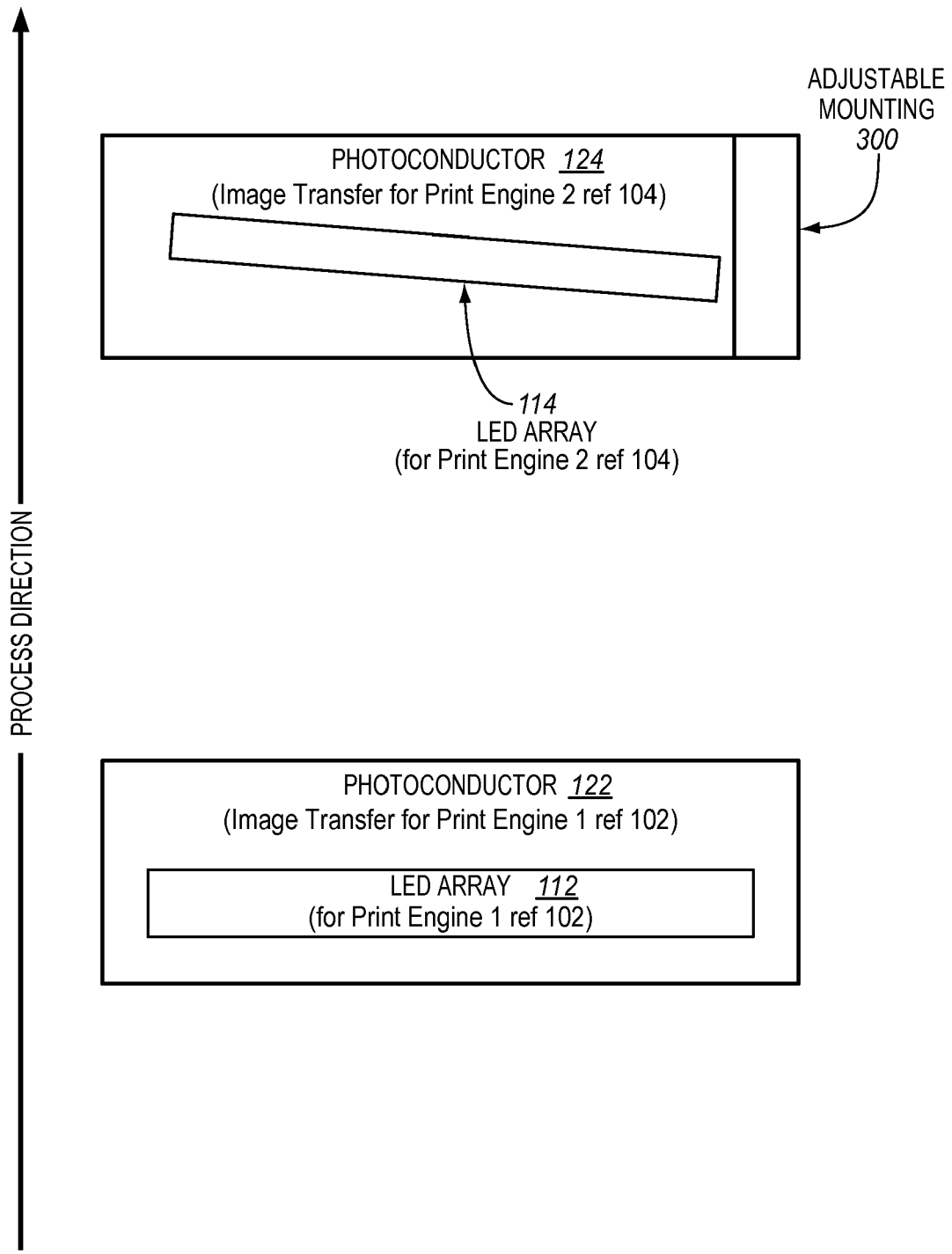
FIG. 3 is a top view similar to FIG. 2 in which a skewed angle LED array of the second print engine effectuates shrinkage of the second image in the width dimension in accordance with features and aspects hereof.

FIG. 3 is another block diagram which, taken in conjunction with FIGS. 1 and 2, suggests the angular orientation of LED array 114 of print engine 2 104 relatives to a nominal position (i.e., that of LED array 112 of print engine 1 102) orthogonal to the process direction of the moving printable medium. Whereas LED array 112 applies image scan lines to photoconductor 122 in the nominal orthogonal position (relative to the printable medium process direction), LED array 114 is skewed from that nominal angle as it applies image information to photoconductor 124 of print engine 2 104.

Adjustable mounting element 300 represents a suitable means for establishing and holding the angle of LED array 114 relative to photoconductor 124 of print engine 2 104. For example, adjustable mounting element 300 may represent simple, manually adjusted set screws and/or bolt configurations for manually setting and holding the angle of LED array 114. Further, adjustable mounting element 300 may represent electro-mechanical elements such as servo motors and/or electronic actuators for controllably, automatically setting and holding the angle of LED array 114. Control mechanisms not shown in FIG. 3 may be coupled to such an electromechanical adjustable mounting so as to automatically set and hold the angle of LED array 114. Still further, those of ordinary skill in the art will readily recognize a variety of automated measurement sensors and techniques to automatically measure the amount of shrinkage and to correspondingly, automatically adjust the angle of LED array 114 in response thereto. Particular control methods and processes for such automated or semi-automated control of the mounting angle of the LED 114 as well as methods and processes for measuring the amount of shrinkage of the printable medium will be readily apparent to those of ordinary skill in the art.

Those of ordinary skill in the art will readily recognize that FIG. 3 is not intended to precisely depict any particular angle of mounting of LED array 114 relative to photoconductor 124. Rather, FIG. 3 is merely intended to suggest the general configuration of skewing of LED array 114 to compensate for the shrinkage of the printable medium passing between the two dual/tandem print engines.

Figure 4:
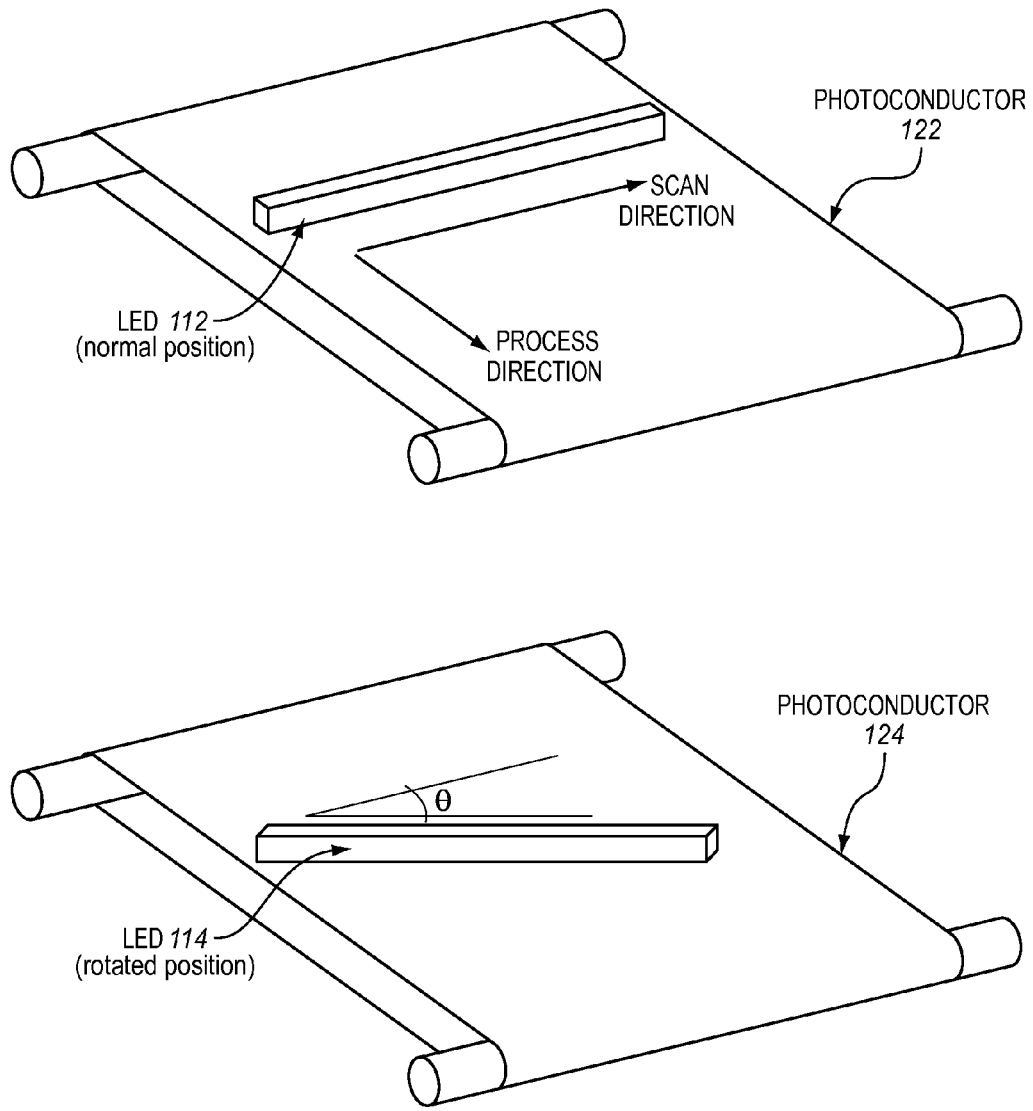
FIG. 4 is an oblique view of the dual photoconductors and dual printhead LEDs of a dual/tandem printing system with the second LED array skewed in accordance with features and aspects hereof.

FIG. 4 is similar to FIG. 3 in that only the LED and photoconductor elements of each of the dual/tandem print engines are shown. These elements are shown in abstract form to suggest the angular skew of the LED array in the second print engine of the dual/tandem print engine pair. In particular photoconductor 122 and photoconductor 124 of print engines 102 and 104, respectively, are shown as flexible belt structures as commonly known in the art. Photoconductor 122 is shown positioned in a nominal position relative to LED array 112 of print engine 1 102. The nominal process direction (e.g., movement of photoconductor 122 and the printable medium) and the orthogonal orientation of the nominal scan direction are shown as orthogonal arrows on the surface of a photoconductor 122.

By contrast, LED array 114 is mounted at a skewed angle (θ—"theta") relative to this nominal scan direction shown above on photoconductor 122. The angular mounting of LED array 114 (whether fixed, dynamic, manually configured, or automatically configured) compensates for the shrinkage of the printable medium passing from the first print engine into the second print engine. The compensation is due to the reduced exposure length of the scan lines applied to the photoconductor.

Figure 5:
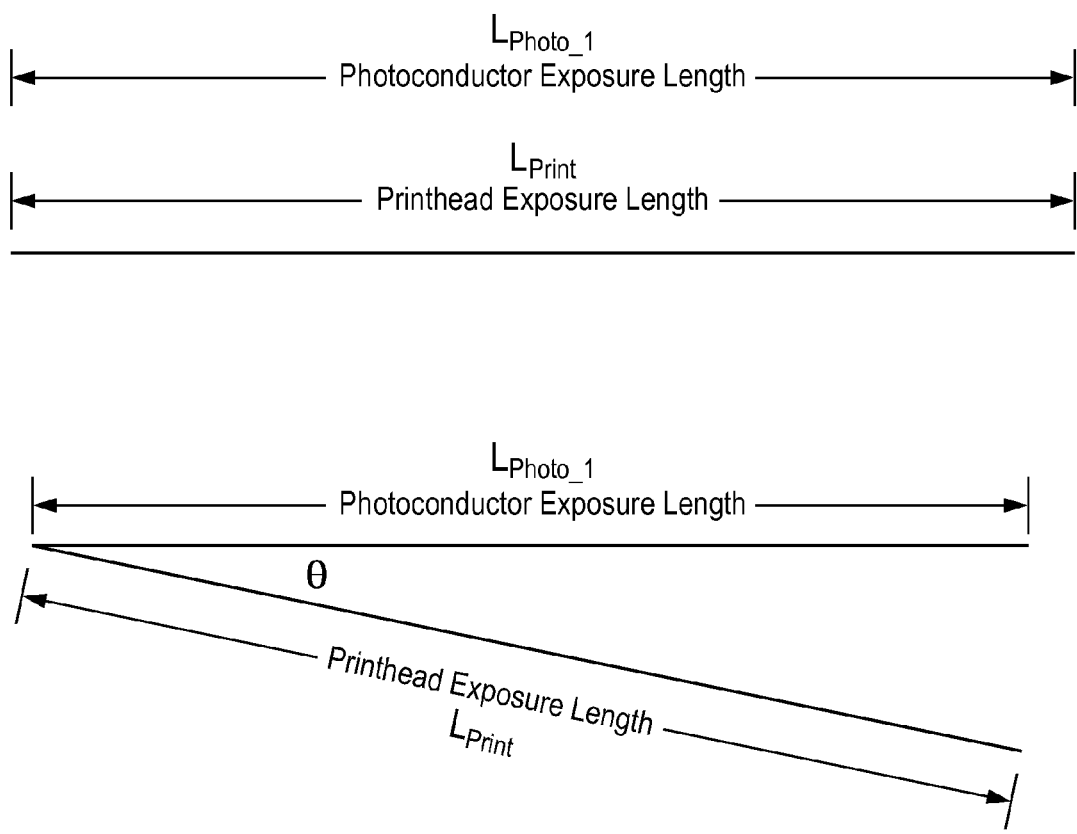
FIG. 5 is a diagram representing the trigonometric relationship between the skewed angle LED array and the resulting shortened exposure length in accordance with features and aspects hereof.

FIG. 5 is a diagram showing the difference in the photoconductor exposure length (Lphoto1) using printhead exposure length (Lprint) in the nominal, orthogonal orientation as compared to the reduced photoconductor exposure length (Lphoto2) generated using the same printhead LED exposure length (Lprint) skewed by an angle θ (theta). In other words, the effective exposure length of a fixed length printhead in the scan direction is altered by controlling the angle of skew (θ) for the printhead in the second print engine. A trigonometric relationship is established such that $COS(θ)=Lphoto2/Lprint$.

Empirical test data suggests that a common, paper, printable medium shrinks approximately 0.5% in the width dimension upon exit from the fuser/fixer of the first print engine. Using the above relationship, the preferred angle θ can be approximated as $COS^{-1}(1-0.005)$ or approximately 5.73°. Those of ordinary skill in the art will also recognize that since the radiated light emissions of each LED of the rotated LED array is closer to its neighbor in the width dimension; it may be useful to controllably reduce the radiated emissions slightly to help ensure a proper voltage is applied to the photoconductive surface. Such power adjustments and control circuits therefore are well known to those of ordinary skill in the art.

Those of ordinary skill in the art will further recognize that for the second image on the second print engine to print correctly with a rotated, skewed LED array, the data transmitted to the LED array must be similarly modified or skewed to thereby generate a substantially correct image on the photoconductor surface. When the LED array, as in the first print engine, is in the nominal, orthogonal position, image data is simply transmitted to the LED array on a scan line by scan line basis using the pixel format in which the bitmap image is rendered or rasterized. However, when the printhead LED array is rotated or skewed by the angle θ, such a simple scan line by scan line transmission of the pixel data as rendered is no longer possible. Rather, the rendered bitmap image data is modified for application to the LED array. The mathematical modifications may be performed on the image data prior to transmission to the LED array or may be performed within the LED array as image data is received from a controller device.

Figure 6:
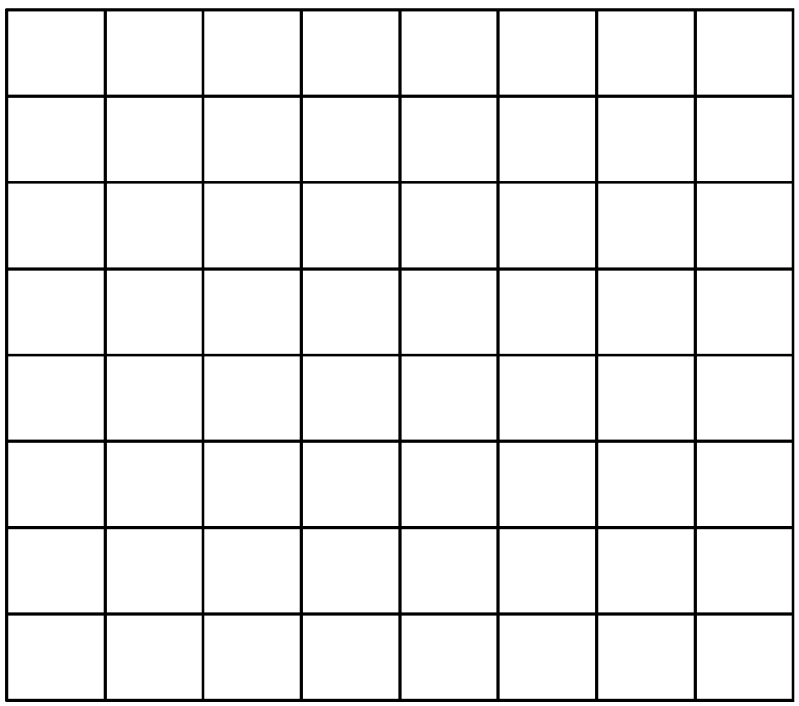
FIG. 6 is a figure representing the skewing of the second bitmap image to match the skew angle of the LED array of the second print engine in accordance with features and aspects hereof.
Figure 6:
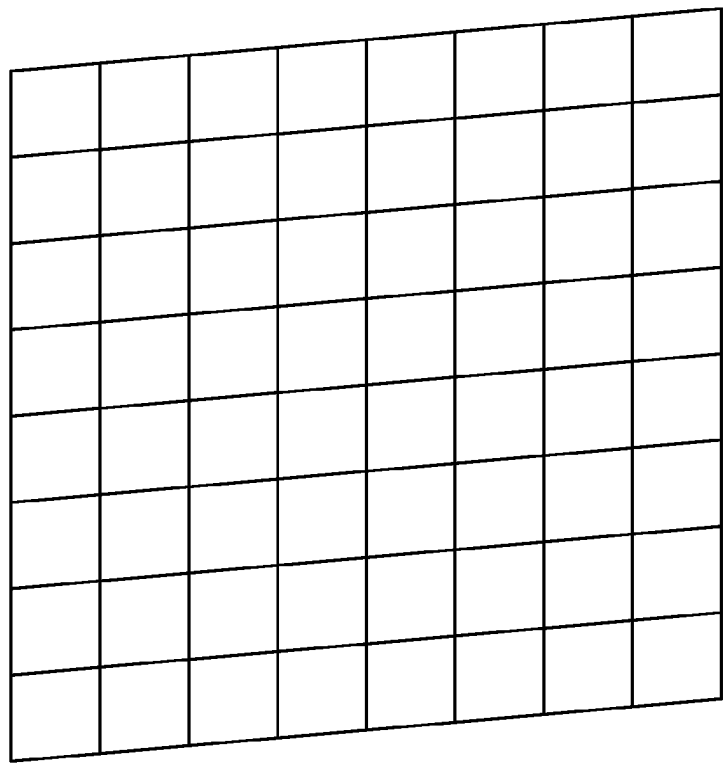

FIG. 6 is a diagram representing the bitmap image data as initially rendered for application to a nominally positioned LED array (as in the first print engine) and as mathematically skewed for application to a correspondingly skewed LED array as in the second print engine in accordance with features and aspects hereof. The top portion of FIG. 6 represents the standard pixel data for a nominally positioned LED array. Each box represents a single pixel (dramatically enlarged for this discussion). The lower portion of FIG. 6 represents the same pixels mathematically skewed by the angle θ corresponding to the skew angle of the LED array of the second print engine. This skewed bitmap image, when applied to the skewed LED array effectively cancels the angle of the skewed LED array to generate a substantially normal, nor-skewed representation of the same pixels shrink in the width dimension.

The trigonometric arithmetic used for shifting the image data is straightforward and readily ascertained by those of ordinary skill in the art. In essence, each column of the bitmap data is shifted upward by an appropriate number of pixel locations to effectively form the required angle θ to match the skew angle of the LED array. The actual upward shift of each column may be in essence little more than the truncated value of the SINE of the angle (θ) multiplied by the column number. Since the image is in effect a binary image, only full integer pixel values are used for the shifting of each column. Those of ordinary skill in the art will readily recognize mathematical extensions to such a technique to permit fractional pixel shifting depending on the structure and capabilities of a particular LED array circuit.

The following pseudo-code example provides a script encoded in the Matlab script language (widely known to those of ordinary skill in the art) suggesting simple mathematics appropriate to skew a bitmap image to match to the skew angle of an LED array. This exemplary pseudo-code is by no means intended as an optimal implementation but rather suggests an exemplary algorithm for accomplishing the desired shift. Those of ordinary skill in the art will readily recognize a wide variety of optimal mathematical solutions for this algorithm based upon integer approximations and standard arithmetic and logic circuits. Thus, the exemplary algorithm may be implemented either as suitably programmed instructions executed by a general or special purpose processor or may be embodied as a custom designed circuit designed to compute the desired image skew either utilizing floating point real numbers, fixed point decimal numbers, or integer approximations.

Noting that the image data is essentially binary and that only integral upward pixel shift of the data is performed by the above exemplary algorithm, it is likely certain visual image artifacts and anomalies may be generated depending on the particular algorithm employed and the precision of the arithmetic computations. Such visual anomalies and artifacts may be minimized by a number of well known mathematical computations to round the mathematics and smooth the resulting image data. Further, empirical data suggests that at a sufficiently high resolution (such as 1200 DPI or above), these visual artifacts and anomalies are virtually undetectable by the human eye and thus may be deemed unimportant.

Figure 7:
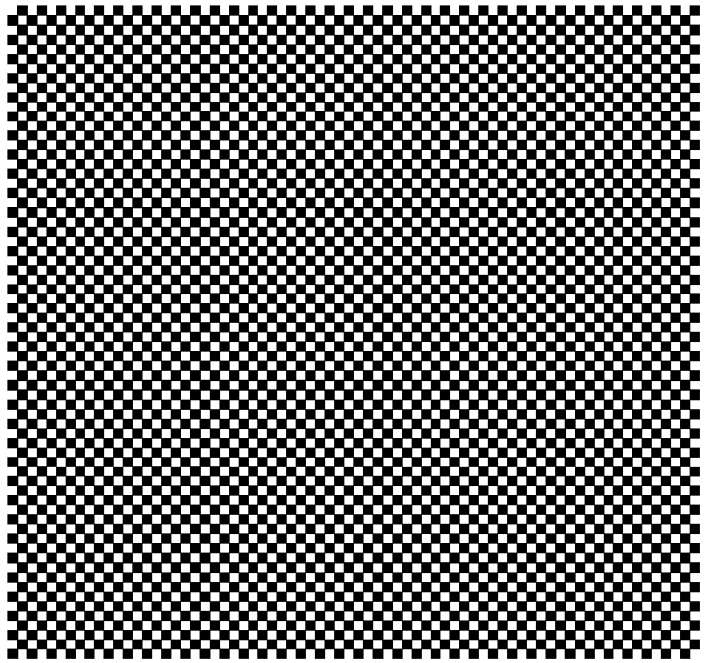
FIG. 7 is a figure graphically representing typical visual artifacts and anomalies generated by the mathematical modification of the second image bitmap in accordance with features and aspects hereof.
Figure 7:
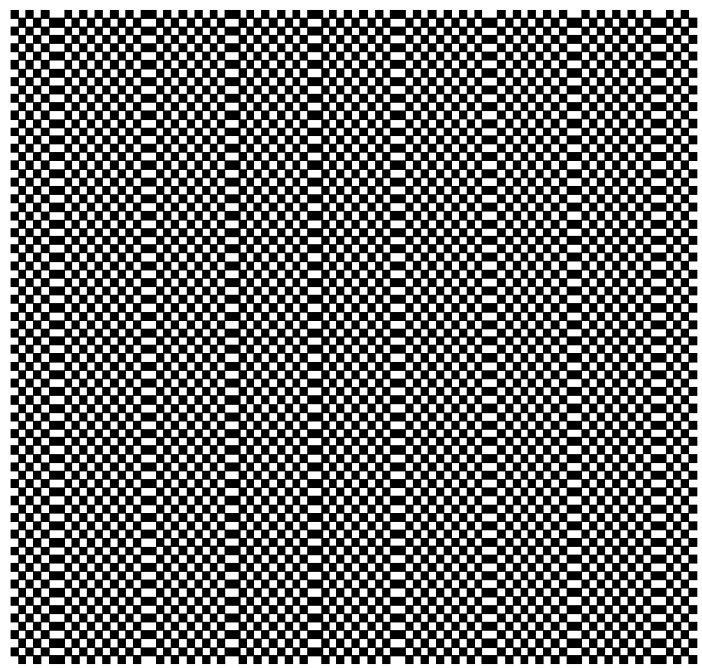

FIG. 7 is a diagram suggesting the visual effect of such graphical artifacts and anomalies due to arithmetic approximations used to skew the binary image data. The top portion of FIG. 7 represents an alternating pixel checkerboard pattern generated by a nominally positioned LED array. Each pixel is substantially enlarged from the nominal high resolution (such as 1200 DPI) for purposes of this discussion. The lower portion of FIG. 7 suggests the type of visual artifact and anomaly that may be generated by mathematical approximations such as used in the above presented algorithm. Other similar anomalies and artifacts may be generated by equivalent algorithms. All such anomalies and artifacts may be visually reduced by suitable smoothing and rounding techniques well known to those of ordinary skill in the art.

```
function image_skew
% Image_skew shifts an image in discrete pel steps column by column in a
% linear manner. The total amount shifted is determined by input
% parameters.
% output image is stored as: temp_skew.tif
% output image resolution is: variable dpi
dpi=1200;                   % image resolution
image_name='blocks.TIF';    % name of input file (input file must be binary)
x=imread(image_name);       % read the file
n0=size(x);                 % determine the size of image in pels
magnification_data=[2,(20.0.*25.4)];    % paper shrinkage data
% magnification_data(1) is expected shrinkage over scan length
% scan length
% the ratio of the next statement is the length of the desired length (or
% width of paper after shrinkage) divided by width of paper before
% shrinkage.
delta_process=(magnification_data(2)-magnification_data(1))./magnification_data(2);
delta_process=acos(delta_process); % form angle from above ratio
y=sin(delta_process);       % sine of the angle above
delta_process=floor(n0(2).*y); % maximum number of pels to shift at extreme right
% form a blank matrix with width same as image size and height that is the
% maximum extreme right shift.
blank=~uint8(0); % initialize variable blank
blank=repmat(blank,delta_process,n0(2));    % initialize blank as matrix
x=[blank;x]; % Concatenate blank space on top of image
n0=size(x);         % new size of image
m0=n0(2);           % width of the image (scan length)
n0=n0(1);           % new image length
blank=~uint8(0);    % initialize variable blank
x2=repmat(blank,n0,m0); % initialize space for modified image
for m=1:1:m0        % loop to shift image
    y1=floor(y.*m);     % calculate the number of pels to shift upward
    x1=x(:,m);          % select column to shift
    m1=-y1;             % form negative number of pels to shift upward
    x1=circshift(x1,m1);  % shift column upward and wrap overflow to bottom
    x2(:,m)=x1;         % store shifted column
    if mod(m,50)==0     % status update
        temp=[('starting line '),num2str(m,'%6.0f'),(' of '),num2str(m0,'%6.0f')];
        disp(temp)
        imshow(x2)
        drawnow
    end
end         % end loop to shift image
imshow(x2)  % show new image
imwrite(x2,'temp_skew.tif','Resolution',dpi) % store new image as tiff.
```

Regardless of the smoothing, rounding, and approximation techniques utilized some visual anomalies and artifacts will likely remain but as noted will be visually insignificant at sufficiently high resolution.

Figure 8:
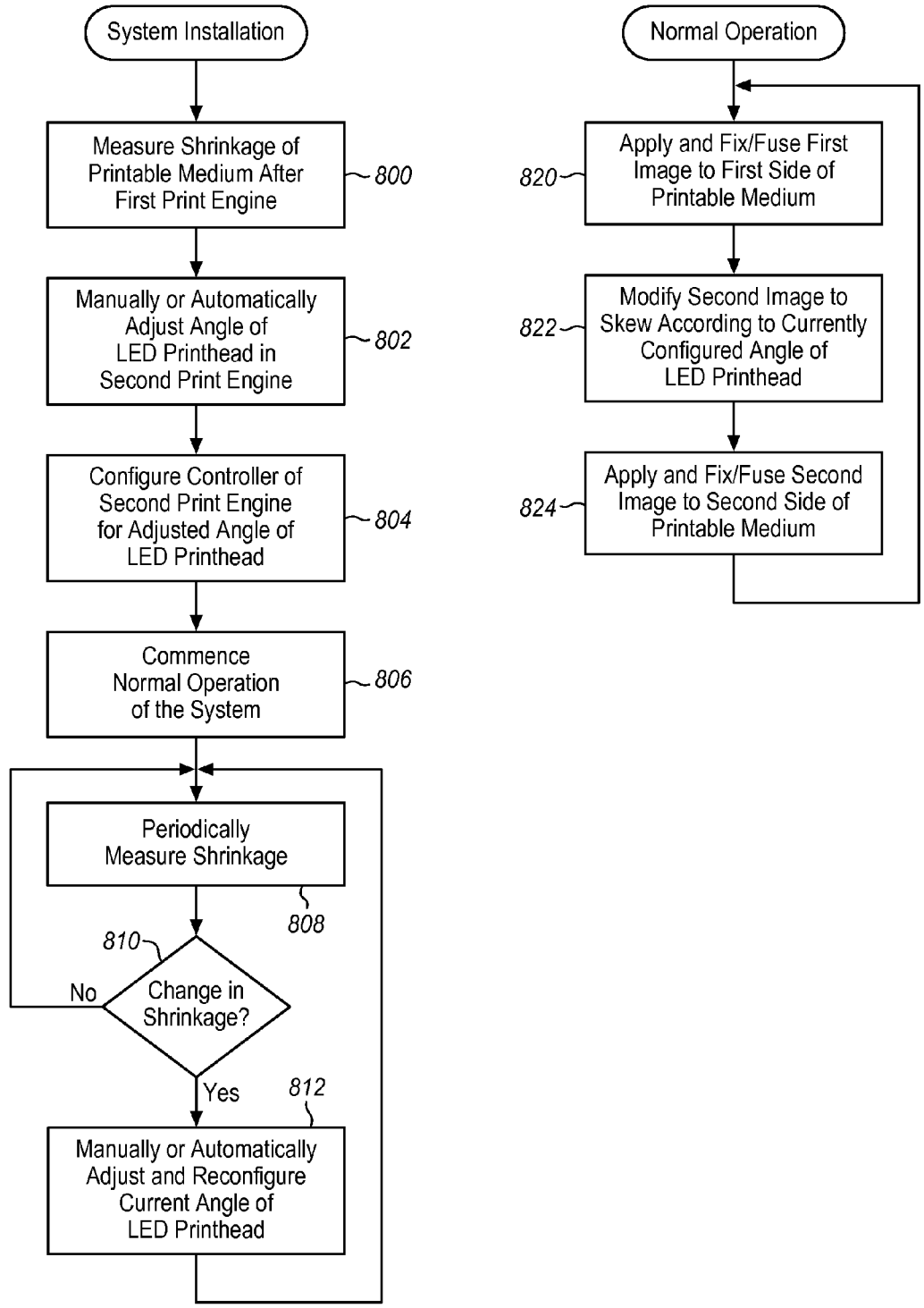
FIG. 8 is a method in accordance with features and aspects hereof to adjust a skew angle of the LED array of the second print engine and to correspondingly modify bitmap images applied through the second, skewed LED array in accordance with features and aspects hereof.

FIG. 8 is a flowchart describing a method in accordance with features and aspects hereof for initializing or installing a system as well as for normal ongoing operation with an angular mounted LED array to compensate for shrinkage between dual/tandem print engines. In particular, elements 820 through 824 represent normal operation of the dual/tandem printing system having an angled LED array in the second print engine to compensate for shrinkage of the printable medium exiting the first print engine. Element 820 is first operable to apply and fix/fuse a first image to the first side of the printable medium.

Element 822 is then operable to modify the second image bitmap data for the second side image corresponding to the previously applied and fixed or fused first image. The second image is modified to skew the bitmap image according to the currently configured skew angle of the alley be printed of the second print engine. As noted above, mathematical computations to skew the second image may be performed in advance of transmitting the modified image to the skewed LED array of the second print engine or may be performed by appropriate computational circuits within the LED array upon receipt of the unmodified bitmap image. Element 824 then applies and fixes or fuses the modified second image to the second side of the printable medium.

As noted above, the printable medium may be a continuous form medium and, as also noted above, an appropriate control mechanism coupled to both print engines may sequence and coordinate printing by the dual print engines of corresponding image sides at appropriate positions along the continuous form printable medium. Processing continues looping back iteratively performing the steps of elements 820 through 824 for all images to be printed in a particular print job.

Those of ordinary skill in the art will readily recognize that startup of the normal operation of the method of elements 820 through 824 require that some fixed number of first side images are printed by the first print engine applied to the continuous form printable medium until a second side image is initially applied by the second print engine. This fixed number of images represents a physical separation measured in length of the printable continuous form medium between the first and second print engines and more specifically between the imaging application and fusing components of the first and second print engines. In like manner, those of ordinary skill in the art will recognize that the same fixed number of second side images are applied at the end of a print job by the second print engine without additional first side images allowing the continuous form medium to complete its travel through the second print engine. Such standard job control features and sequencing of images are well known to those of ordinary skill in the art and are eliminated here for simplicity and brevity of this discussion.

Elements 800 through 812 of FIG. 8 represent initialization or installation processing of a dual/tandem print engine system in accordance with features and aspects hereof As noted above, when the printing system having dual/tandem print engines is initially installed, shrinkage of the typical printable medium may be measured and the LED array of the second print engine skewed accordingly. In addition, with the skew angle appropriately set, the print controller of the second print engine may be appropriately configured to correspondingly skew all images transmitted through the skewed LED array. As noted, the bitmap images may be skewed by the printer controller or may be skewed by computation circuits associated with the LED array per se.

In addition to configuring the initial mounting angle and the corresponding parameters of the second print engine controller, features and aspects hereof allow the skew angle of the LED array of the second print engine to be dynamically altered/adjusted during operation of printing system. For example, if the printable medium is changed to a different medium having more or less shrinkage, the skew angle of the LED array of the second print engine may be adjusted accordingly. Appropriate corresponding configuration adjustments to the printer controller to skew all images printed through the skewed LED array made in association with any adjustment to the LED array skewed mounting angle. All such adjustments may be performed by manual means (e.g., mounting screw and/or bolt configurations with sliding adjustments to the LED array mounting position) as well as by automated or semi-automated electro-mechanical adjustment means (e.g., servo motors and/or electronic actuators to controllably, dynamically alter the skew angle of the LED array).

Element 800 therefore represents initial processing to measure the shrinkage of the current printable medium as it exits a first print engine. Such a measurement may be performed manually by an operator or field service representative or may be performed automatically by appropriate sensors and automated measurement devices well known to those of ordinary skill in the art. Element 802 is then operable to manually aid/or automatically adjusts the skew angle of the LED array printhead in the second print engine to compensate for the measured shrinkage of the printable medium exiting the first print engine. Element 804 is further operable to configure the controller of the second print engine to match the generated images to the adjusted skew angle of the LED printhead of the second print engine. Element 806 then commences normal operation of the dual/tandem print engine printing system as discussed above with respect to elements 820 through 824.

As noted above, adjustment of the skew angle of the second print engine LED array must be performed at initialization/installation of the printing system but may also be preformed dynamically as operating parameters of the printing system change. For example, if the printable medium is changed to a different type of medium (e.g., different weight of paper or different type of paper fiber) the skew angle and corresponding controller configuration may be dynamically altered to adjust for the changing operating parameters. Element 808 is therefore operable to measure the current shrinkage of the current printable medium as it exits the first print engine. As above, such measurements may be performed manually by a skilled operator or field service technician or may be performed automatically utilizing appropriate sensors and measurement electronic devices. Element 810 is then operable to determine whether the amount of shrinkage has changed from the previous measurement. If not, processing continues looping back to element 808 to continue measuring shrinkage of the printable medium. If element 810 detects a change in the amount of shrinkage of the printable medium, element 812 is operable similar to elements 802 and 804 above to manually and/or automatically adjust the skew angle of the second print engine LED array and to correspondingly reconfigure the print controller of the second print engine to adjust images applied through the skewed second LED array. Processing then continues looping back to element 808 repeating the periodic measurement of shrinkage and associated dynamic adjustments to the LED array skew angle of the second print engine.

Although specific embodiments were described herein, the scope of the invention is not limited to those specific embodiments. The scope of the invention is defined by the following claims and any equivalents thereof.

We claim:

1. A printing system comprising:
    a first print engine for applying a first image to a printable medium and for fixing the first image on the printable medium; and
    a second print engine for applying a second image to a printable medium and for fixing the second image on the printable medium, wherein the second print engine is adapted to receive the printable medium from the first print engine following fixing of the first image on the printable medium, wherein the second print engine includes:
        an LED array for generating the second image to be applied and fixed on the printable medium; and
        a controller coupled to the LED array for applying rasterized data thereto,
        wherein the LED array is positioned at a non-orthogonal angle relative to a process direction of movement of the printable medium, and
        wherein the controller is adapted to modify the second image for application to the LED array in accordance with the angle of the LED array.

2. The system of claim 1 wherein the angle of the LED array is selected to account for shrinkage of the printable medium following fixing of the first image by the first print engine.

3. The system of claim 1 wherein the angle of the LED array is adjustable to account for shrinkage of the printable medium following fixing of the first image by the first print engine.

4. The system of claim 1 wherein the angle of the LED array is dynamically adjustable by the controller to account for shrinkage of the printable medium following fixing of the first image by the first print engine.

5. The system of claim 1 wherein the controller is adapted to modify the second image by a processor of the controller executing programmed instructions to modify the second image.

6. The system of claim 1 wherein the controller includes an application specific integrated circuit designed to modify the second image in real time as the image is transferred to the LED array.

7. The system of claim 1 wherein the LED array includes an application specific integrated circuit designed to modify the second image in real time as the image is received from the controller.

8. A method for multiple image printing comprising:
    applying a first image to a printable medium using a first print engine;
    fixing the first image to the printable medium;
    adjusting an angle of mounting of an LED array in a second print engine;
    applying, responsive to fixing of the first image, a second image to the printable medium using the LED array; and
    fixing the second image to the printable medium,
    wherein the angle of mounting of the LED array is sufficient to compensate the second image for shrinkage of the printable medium following fixing of the first image.

9. The method of claim 8 further comprising:
    modifying the second image, prior to applying the second image, in accordance with the adjusted angle of mounting of the LED array.

10. The method of claim 9 wherein the step of modifying comprises:
    executing programmed instructions to modify the second image in accordance with the angle of mounting of the LED array.

11. The method of claim 9 wherein the step of modifying comprises:
    applying the second image to an application specific integrated circuit to modify the second image in accordance with the angle of mounting of the LED array.

12. The method of claim 8 wherein the step of adjusting the angle of mounting further comprises:
    adjusting the angle of mounting at installation of the second print engine.

13. The method of claim 8 wherein the step of adjusting the angle of mounting further comprises:
    manually adjusting the angle of mounting to compensate for dynamic changes in the shrinkage of the printable medium produced by the first print engine.

14. The method of claim 8 wherein the step of adjusting the angle of mounting further comprises:
    automatically adjusting the angle of mounting to compensate for dynamic changes in the shrinkage of the printable medium produced by the first print engine.

15. A system for multiple image printing comprising:
    means for applying a first image to a printable medium using a first print engine;
    means for fixing the first image to the printable medium;
    means for adjusting an angle of mounting of an LED array in a second print engine;
    means for applying a second image to the printable medium using the LED array; and
    means for fixing the second image to the printable medium,
    wherein the angle of mounting of the LED array is sufficient to compensate the second image for shrinkage of the printable medium following fixing of the first image.

16. The system of claim 15 further comprising:
    means for modifying the second image, prior to applying the second image, in accordance with the adjusted angle of mounting of the LED array.

17. The system of claim 16 wherein the means for modifying comprises:
    computational means for executing programmed instructions to modify the second image in accordance with the angle of mounting of the LED array.

18. The system of claim 16 wherein the means for modifying comprises:
    circuit means adapted to modify the second image in accordance with the angle of mounting of the LED array.

19. The system of claim 15 wherein the means for adjusting the angle of mounting further comprises:
    manual means for adjusting the angle of mounting to compensate for dynamic changes in the shrinkage of the printable medium produced by the first print engine.

20. The system of claim 15 wherein the means for adjusting the angle of mounting further comprises:
    automatic means for adjusting the angle of mounting to compensate for dynamic changes in the shrinkage of the printable medium produced by the first print engine.

* * * * *

UNITED STATES PATENT AND TRADEMARK OFFICE
CERTIFICATE OF CORRECTION

PATENT NO. : 7,920,279 B2
APPLICATION NO. : 11/549170
DATED : April 5, 2011
INVENTOR(S) : Ernst et al.

It is certified that error appears in the above-identified patent and that said Letters Patent is hereby corrected as shown below:

In column 8, line 60, the text "nor-skewed" should read "non-skewed".

In column 8, line 61, the text "shrink" should read "shrunk".

In column 12, line 28, the text "aid/or" should read "and/or".

In column 12, line 39, the text "preformed" should read "performed".

Signed and Sealed this
Sixth Day of September, 2011

David J. Kappos
*Director of the United States Patent and Trademark Office*